United States Patent
Kobayashi

(10) Patent No.: US 10,591,888 B2
(45) Date of Patent: Mar. 17, 2020

(54) CONTROL SYSTEM FOR DISTRIBUTING DATA

(71) Applicant: Fanuc Corporation, Minamitsuru-gun, Yamanashi (JP)

(72) Inventor: Masanori Kobayashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/257,429

(22) Filed: Jan. 25, 2019

(65) Prior Publication Data
US 2019/0235466 A1 Aug. 1, 2019

(30) Foreign Application Priority Data
Jan. 29, 2018 (JP) .................................. 2018-013034

(51) Int. Cl.
G05B 19/05 (2006.01)
G06F 15/17 (2006.01)
G06F 3/05 (2006.01)

(52) U.S. Cl.
CPC ......... *G05B 19/054* (2013.01); *G05B 19/058* (2013.01); *G06F 3/05* (2013.01); *G06F 15/17* (2013.01)

(58) Field of Classification Search
CPC ....... G05B 19/054; G05B 19/058; G06F 3/05; G06F 15/17
See application file for complete search history.

(56) References Cited

U.S. PATENT DOCUMENTS

| | | | | |
|---|---|---|---|---|
| 5,309,567 A | * | 5/1994 | Mizukami | G06F 15/17 710/110 |
| 6,067,612 A | * | 5/2000 | Sasaki | G05B 19/0421 701/48 |
| 2007/0179637 A1 | * | 8/2007 | Shirai | G05B 19/0428 700/28 |
| 2007/0288673 A1 | * | 12/2007 | Kawaguchi | G05B 19/054 710/110 |
| 2017/0146974 A1 | * | 5/2017 | Etou | G05B 19/416 |
| 2018/0203428 A1 | * | 7/2018 | Thabuis | G05B 19/056 |
| 2018/0299853 A1 | * | 10/2018 | Wang | G05B 19/0423 |

FOREIGN PATENT DOCUMENTS

| | | |
|---|---|---|
| JP | 2005-250543 A | 9/2005 |
| JP | 2006154919 A | 6/2006 |
| JP | 2007-249903 A | 9/2007 |
| JP | 2008219512 A | 9/2008 |
| JP | 2012005004 A | 1/2012 |

OTHER PUBLICATIONS

Notice of Reasons for Refusal for Japanese Application No. 2018-013034, dated Oct. 8, 2019, with translation, 6 pages.

* cited by examiner

Primary Examiner — Glenn A. Auve
(74) Attorney, Agent, or Firm — RatnerPrestia

(57) ABSTRACT

A control system that distributes information from a control device to a reception device includes a read request transmission unit that transmits a read request for information to the control device, an information generation unit that generates information in response to the read request, an information transmission unit that transmits the generated information to the reception device, and a distribution cycle computation unit that computes a distribution cycle based on a generation interval of the read request. The information transmission unit transmits the information in accordance with the distribution cycle computed by the distribution cycle computation unit.

4 Claims, 14 Drawing Sheets

CONTROL SYSTEM FOR DISTRIBUTING DATA

CROSS-REFERENCE TO RELATED APPLICATION

This application is a new U.S. Patent Application that claims benefit of Japanese Patent Application No. 2018-013034 filed Jan. 29, 2018, the disclosure of this application is being incorporated herein by reference in its entirety for all purposes.

BACKGROUND OF THE INVENTION

1. Field of the Invention

The present invention relates to a control system and in particular relates to a control system that distributes data at optimum timing.

2. Description of the Related Art

An existing information processing system (hereinafter referred to as "control system") displays and monitors various pieces of information (which will be simply referred to as "information" in the following descriptions) including amongst others a state or the like of control devices which may include, and are not limited to, a numerical control device, a robot controller, and a programmable logic controller (PLC) (which will be simply referred to as "control device" in the following description). In a typical control system, an information processing device such as a personal computer connected to the control device (hereinafter referred to as "reception device") reads the information from the control device. The control device and the reception device are connected to each other, for example, by network communications.

FIG. 1 illustrates a mode of the control system. The reception device issues and sends a request for reading of the information (read request) to the control device. The control device transmits the necessary piece(s) of the information (response) in response to the read request. A control system that performs information distribution processing triggered by the read requests in this manner on a per-request basis is referred to as "request/response type."

FIG. 2 illustrates another mode of the control system. The reception device issues and sends the read request with designation of a distribution cycle to the control device. The control device transmits the necessary piece(s) of the information at the distribution cycle designated in the read request. The information that has been transmitted is stored in a buffer of the reception device. The reception device reads the information stored in the buffer according to any appropriate timing. A control system that performs information transmission processing as a periodical operation in this manner is referred to as "distribution type." It should be noted that the periodical information transmission realized by the control system is referred to as "distribution" and the individual information transmission performed by the constituent components of the control system such as the control device is referred to as "transmission" throughout the specification.

Japanese Patent Application Laid-Open No. 2005-250543 and Japanese Patent Application Laid-Open No. 2007-249903 may be mentioned as relevant techniques associated with the information transmission processing of the above-described "distribution type."

Japanese Patent Application Laid-Open No. 2005-250543 discloses a system that smoothly performs data updates (display) by adjusting a data update cycle without causing visual discomfort in a case where it is difficult to perform smooth data updates due to congestion of the network or the like. Japanese Patent Application Laid-Open No. 2007-249903 discloses a system that uninterruptedly acquires successive pieces of operation data without being influenced by the load status of the monitoring-side computer (which corresponds to the reception device).

The following problems associated with determination of the distribution cycle are found in a control system that includes a control device performing information transmission processing of the above-described "distribution type."

If software programs running on the reception device are not designed to support periodical information reading, the distribution cycle that the reception device should designate for the control device is unknown. As a result, traditionally, engineers need to investigate the operation of the software programs running on the reception device to determine the optimum distribution cycle. This work requires a great deal of labor by the engineers and involves considerable uncertainty because the result depends upon the abilities of the individual engineers. If the distribution cycle that has been determined is unnecessarily long, the software programs on the reception device may fail to exhibit their intended performances. On the other hand, if the distribution cycle that has been determined is unnecessarily short, the load for performing information generation processing and information transmission processing may increase unnecessarily, adversely affecting the operation of the control device. Hence, it has been desirable to provide a function that automatically determines the distribution cycle appropriate for both the reception device and the control device.

It should be noted that the disclosures of the Japanese Patent Application Laid-Open No. 2005-250543 and Japanese Patent Application Laid-Open No. 2007-249903 are both related to the techniques for adjusting the distribution cycle basically on the basis of the state of the reception device and do not contain specifics of a scheme for adjusting the distribution cycle on the basis of the state of the control device.

SUMMARY OF THE INVENTION

An object of the present invention, which has been made to solve such a problem, is to provide a control system that distributes data at optimum timing.

The control system according to an embodiment of the present invention is a control system that distributes information from a control device to a reception device. The control system includes a read request transmission unit configured to transmit a read request to read the information to the control device, an information generation unit configured to generate the information in response to the read request, an information transmission unit configured to transmit the generated information to the reception device, and a distribution cycle computation unit configured to compute a distribution cycle on the basis of a generation interval of the read request. The information transmission unit transmits the information in accordance with the distribution cycle that has been computed by the distribution cycle computation unit.

The control system according to an embodiment of the present invention may also be characterized by the fact that the reception device includes the distribution cycle computation unit, a buffer configured for reception of the information transmitted in accordance with the distribution cycle, and a reading unit configured to read the information from the buffer, and the distribution cycle computation unit is configured to stop transmission of the information in accordance with the distribution cycle when a read interval at which the reading unit reads the information satisfies a predetermined condition.

The control system according to an embodiment of the present invention may further be characterized by the fact that the control device includes the distribution cycle computation unit and a state acquisition unit configured to acquire a state of the control device, and the distribution cycle computation unit is configured to compute the distribution cycle on the basis of the state.

The control system according to an embodiment of the present invention may also be characterized by the fact that the information generation unit is configured to compare the distribution cycle computed on the basis of the generation interval of the read request with the distribution cycle computed on the basis of the state of the control device and transmit the information in accordance with the longer one of the distribution cycles.

The present invention makes it possible to provide a control system that distributes data at optimum timing.

BRIEF DESCRIPTION OF THE DRAWINGS

These and other objects and features of the present invention will become apparent from the following explanations of the examples in the embodiments, which are to be read in conjunction with the accompanying drawings, in which.

DETAILED DESCRIPTION OF THE PREFERRED EMBODIMENTS

Hardware configurations of a control system 1 according to embodiments of the present invention will now be described with reference to the drawings.

Figure 1:
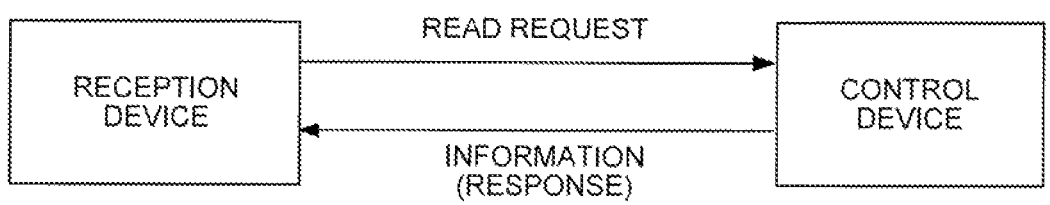
FIG. 1 is a diagram illustrating a configuration of a traditional control system of a "request/response type;"
Figure 2:
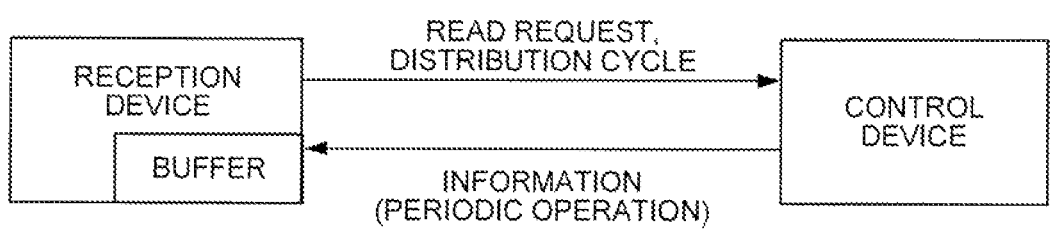
FIG. 2 is a diagram illustrating a configuration of another traditional control system of a "distribution type;"
Figure 3:
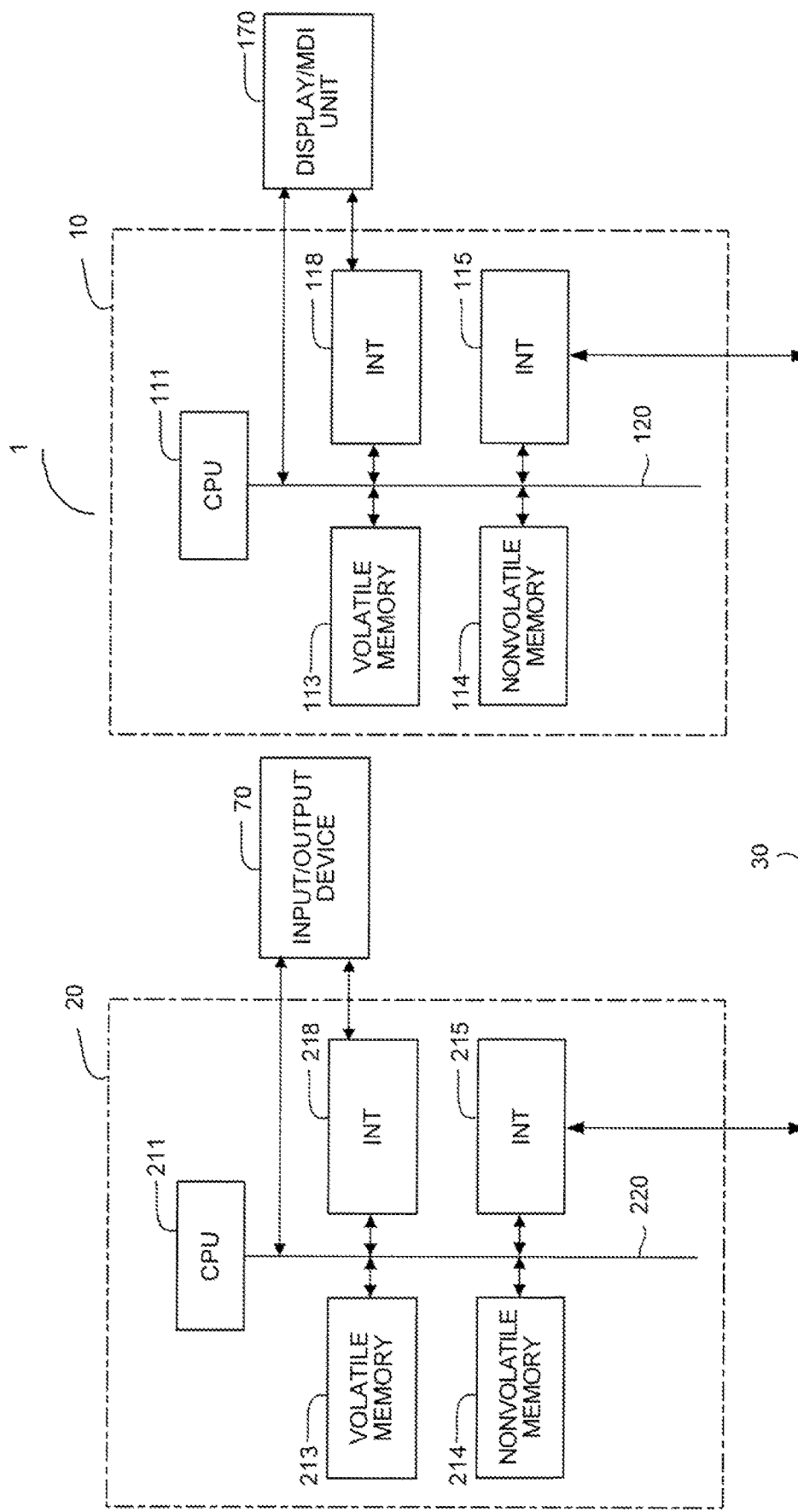
FIG. 3 is a diagram illustrating a hardware configuration of a control system 1.

FIG. 3 is a hardware configuration diagram that illustrates key features of the control system 1 according to one or more embodiments of the present invention. The control system 1 includes a control device 10 and a reception device 20. The control device 10 and the reception device 20 are connected to each other via a communication network 30.

The control device 10 includes a CPU 111 which is a processor adapted to control the control device 10 as a whole. The CPU 111 reads a program or programs stored in a non-volatile memory unit 114 therefrom via a bus 120 to control the control device 10 as a whole in accordance with the program(s).

The non-volatile memory unit 114 is configured as a memory unit that retains its state of storage even when the power source of the control device 10 is turned off, for example, by being backed up by a battery (not shown). The program(s) and data stored in the non-volatile memory unit 114 may be deployed in use onto a volatile memory unit 113. In addition to the program(s) and data deployed from the non-volatile memory unit 114, the volatile memory unit 113 may store temporary data associated with calculation, data to be displayed, data entered by a display/MDI unit 170, and any other relevant data.

The display/MDI unit 170 is a data input/output device which may include a display, a keyboard, and/or any other relevant elements. A command or data entered by the keyboard of the display/MDI unit 170 is delivered to the CPU 111 via an interface 118. Also, the data to be displayed which has been output from the CPU 111 is displayed on the display of the display/MDI unit 170 via the interface 118.

The interface 115 is a communication interface for establishing connection between the control device 10 and the reception device 20. The interface 115 is configured to output data to be transmitted onto the communication network 30. The interface 115 is also configured to acquire data to be received from the communication network 30.

The reception device 20 includes a CPU 211 which is a processor configured to control the reception device 20 as a whole. The CPU 211 is configured to read a program or programs stored in a non-volatile memory unit 214 via a bus 220 and control the reception device 20 as a whole in accordance with the program(s).

The non-volatile memory unit 214 is configured as a memory unit that retains its state of storage even when the power source of the reception device 20 is turned off, for example, by being backed up by a battery (not shown). The program(s) and data stored in the non-volatile memory unit 214 may be deployed in use onto a volatile memory unit 213. In addition to the program(s) and data deployed from the non-volatile memory unit 214, the volatile memory unit 213 may store temporary data associated with calculation, data to be displayed, data entered by the input/output device 270, and any other relevant data.

The input/output device 270 may include a display, a keyboard, and any other relevant elements. A command or data entered by the keyboard of the input/output device 270 is delivered to the CPU 211 via an interface 218. Also, the data to be displayed which has been output from the CPU 211 is displayed on the input/output device 270 via the interface 218.

The interface 215 is a communication interface for establishing connection between the control device 10 and the reception device 20. The interface 215 is configured to output data to be transmitted onto the communication network 30. The interface 215 is also configured to acquire data to be received from the communication network 30.

Specific embodiments of the control system 1 will now be described with reference to the drawings.

First Embodiment

The control system 1 which will be described hereinbelow as the first embodiment is capable of automatically making a transition to the information transmission of a "distribution type" when multiple rounds of information transmission of a "request/response type" have been performed.

Figure 4:
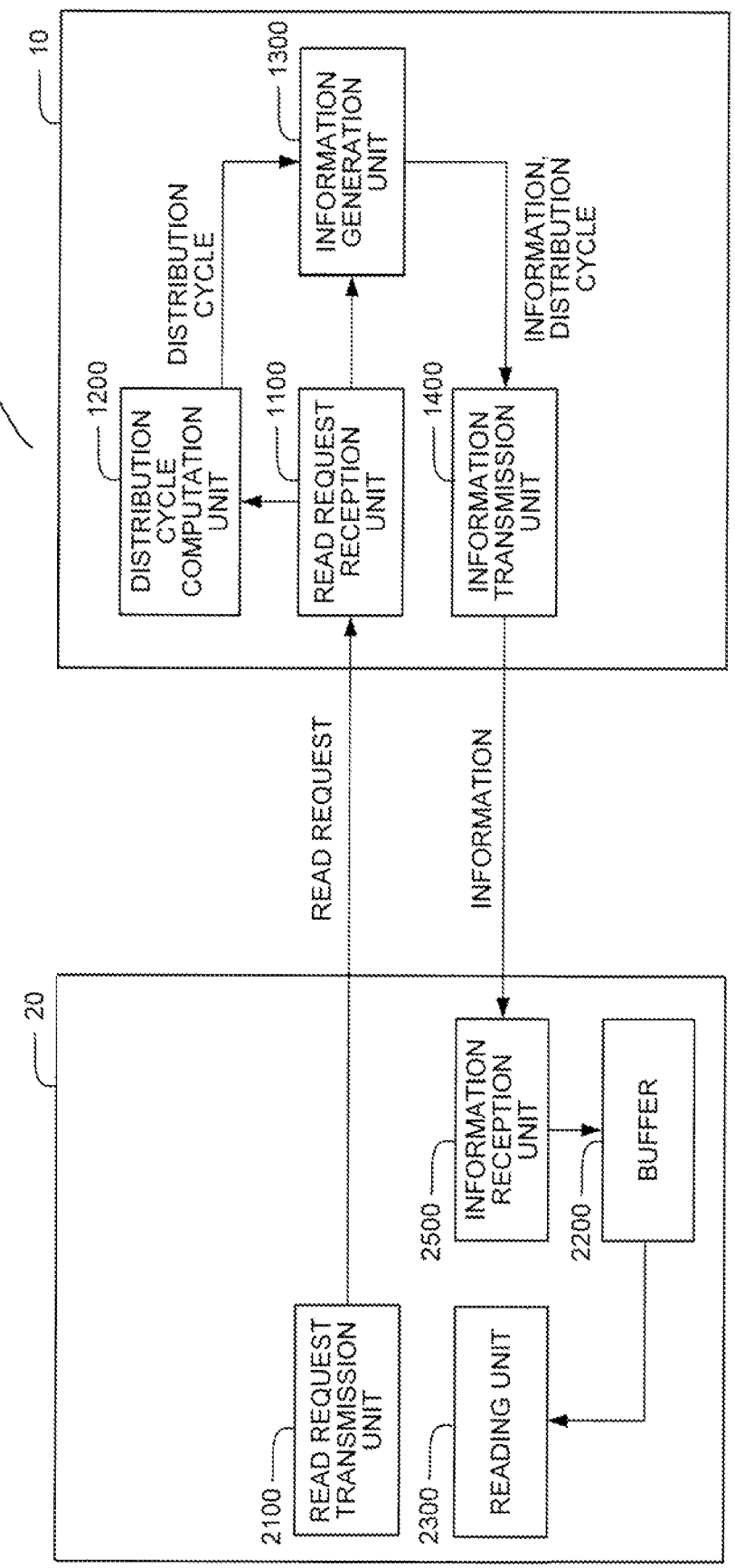
FIG. 4 is a block diagram illustrating a functional configuration of the control system 1 according to a first embodiment.

FIG. 4 is a block diagram that illustrates the functional configuration of the control system 1 according to the first embodiment. The control system 1 includes the control device 10 and the reception device 20.

The control device 10 includes a read request reception unit 1100 configured to receive a read request, a distribution cycle computation unit 1200 configured to automatically compute a distribution cycle, an information generation unit 1300 configured to generate information in response to the read request, and an information transmission unit 1400 configured to transmit the information at the distribution cycle that has been computed by the distribution cycle computation unit 1200.

The reception device 20 includes a read request transmission unit 2100 configured to generate a read request and transmit the read request to the control device 10, an information reception unit 2500 configured to receive the information that has been transmitted, a buffer 2200 configured to temporarily store the information that has been received, and a reading unit 2300 configured to read the information from the buffer 2200.

Figure 5:
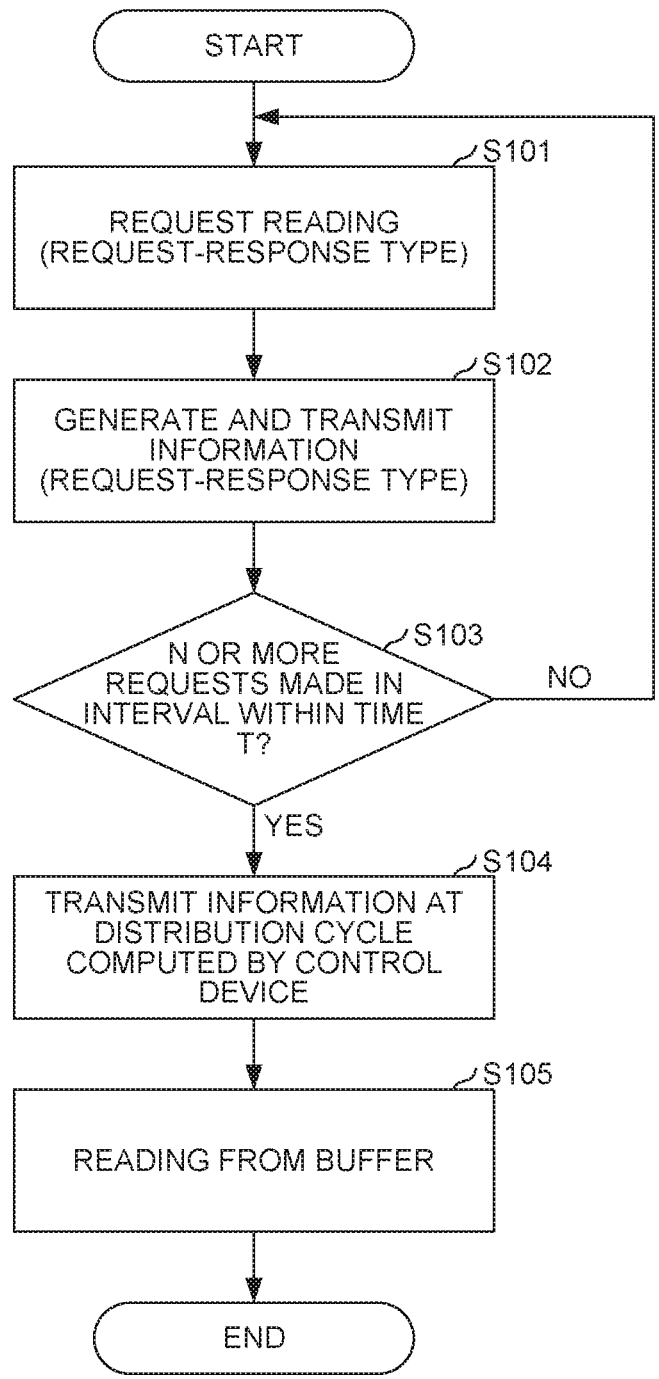
FIG. 5 is a flowchart illustrating operation of the control system 1 according to the first embodiment.

The operation of the control system 1 according to the first embodiment will be described with reference to the flowchart of FIG. 5.

Step S101: The read request transmission unit 2100 of the reception device 20 generates a read request and transmits the read request to the control device 10 via the communication network 30. It should be noted here that the read request does not include any designation of the distribution cycle. Specifically, a read request of a "request/response type" is transmitted.

Step S102: The read request reception unit 1100 of the control device 10 receives the read request transmitted in the step S101. The information generation unit 1300 generates the requested information as a response to this read request. This information may be typically associated with a state of the control device. Since the generation process of the information pertains to known techniques, detailed explanation thereof is omitted. The information transmission unit 1400 transmits the generated information to the information reception unit 2500 of the reception device 20 via the communication network 30. Specifically, information transmission of a "request/response type" is performed here.

Step S103: The distribution cycle computation unit 1200 computes an interval "t" between the reception time of the previous read request and the reception time of the read request of this time, where the interval "t" is computed every time the read request reception unit 1100 receives the read request. Here, if the interval "t" is equal to or smaller than a threshold T, then a cumulative request count "n" (the initial value is 0) is incremented by 1. On the other hand, if the interval "t" is larger than the threshold T, then the cumulative request count "n" is initialized (cleared to the initial value 0).

If the cumulative request count "n" becomes equal to or larger than the threshold N, then the distribution cycle computation unit 1200 computes the distribution cycle according to the following expression (1) and notifies the computed distribution cycle to the information generation unit 1300. Also, the distribution cycle is notified from the distribution cycle computation unit 1200 or the information generation unit 1300 to the information transmission unit 1400.

$$\text{Distribution cycle} = (\text{cumulative value of the intervals } t \text{ for } N \text{ times from } n=1 \text{ to } N)/N \quad (1)$$

Step S104: The information generation unit 1300 generates the information associated with the read request received in the step S102, for example, at the distribution cycle notified in the step S103. It should be noted that the information generation unit 1300 may generate the information in accordance with any other appropriate cycles. The information transmission unit 1400 transmits the generated information to the information reception unit 2500 of the reception device 20 via the communication network 30 at the distribution cycle notified in the step S103.

Step S105: The information reception unit 2500 of the reception device 20 stores the transmitted information in the buffer 2200. The reading unit 2300 reads the information stored in the buffer 2200 according to any appropriate timing.

According to the first embodiment, the control device 10 can determine that the reception device 20 is performing a periodical read request when the read requests of the "request/response type" have been received for N or more times in the interval within the time T, automatically compute the distribution cycle, and make a transition to the information transmission of the "distribution type."

Second Embodiment

Figure 6:
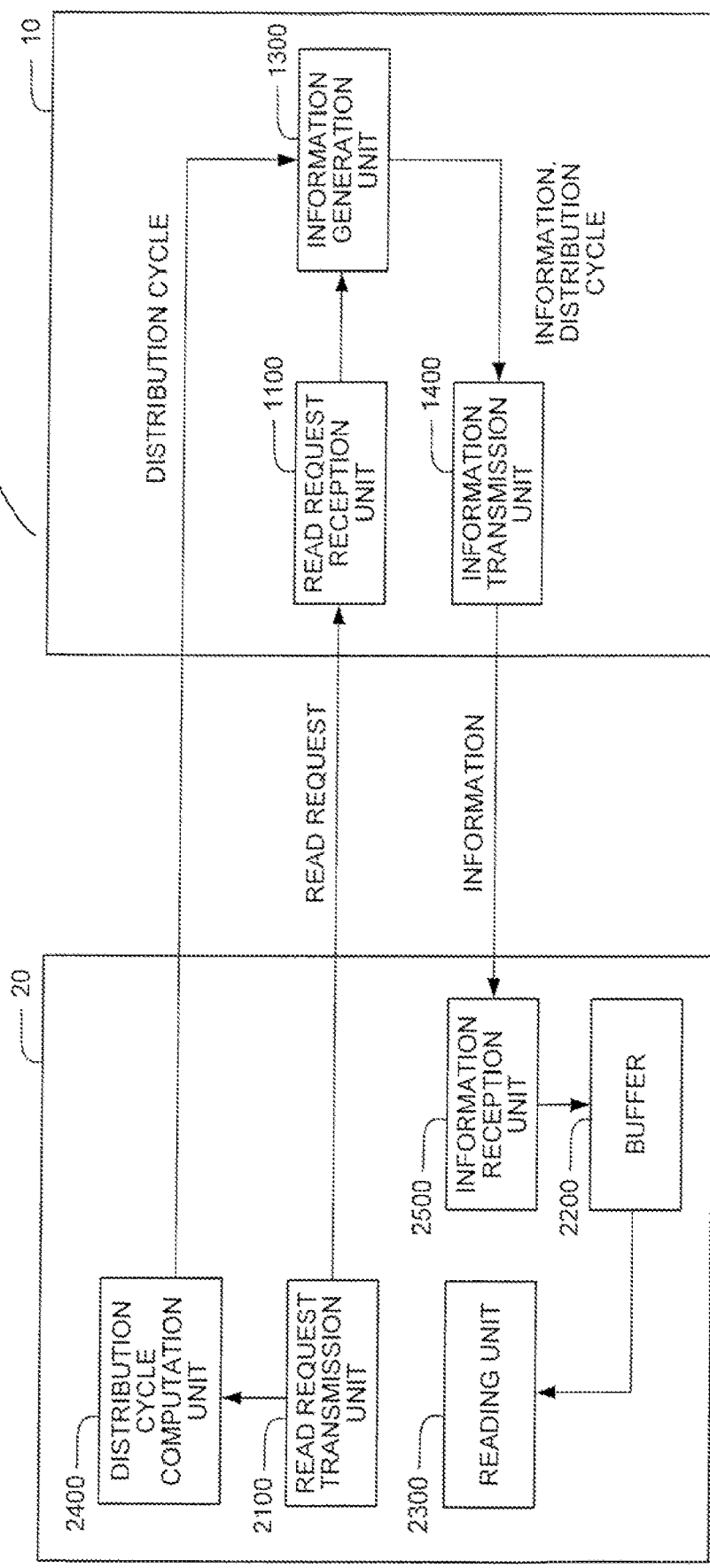
FIG. 6 is a block diagram illustrating a functional configuration of the control system 1 according to a second embodiment.

The second embodiment is a modified example of the first embodiment. FIG. 6 is a block diagram that illustrates the functional configuration of the control system 1 according to the second embodiment. The second embodiment differs from the first embodiment in that the control device 10 does not include the distribution cycle computation unit 1200 and instead the reception device 20 includes the distribution cycle computation unit 2400. The other constituent components are the same as those of the first embodiment.

Figure 7:
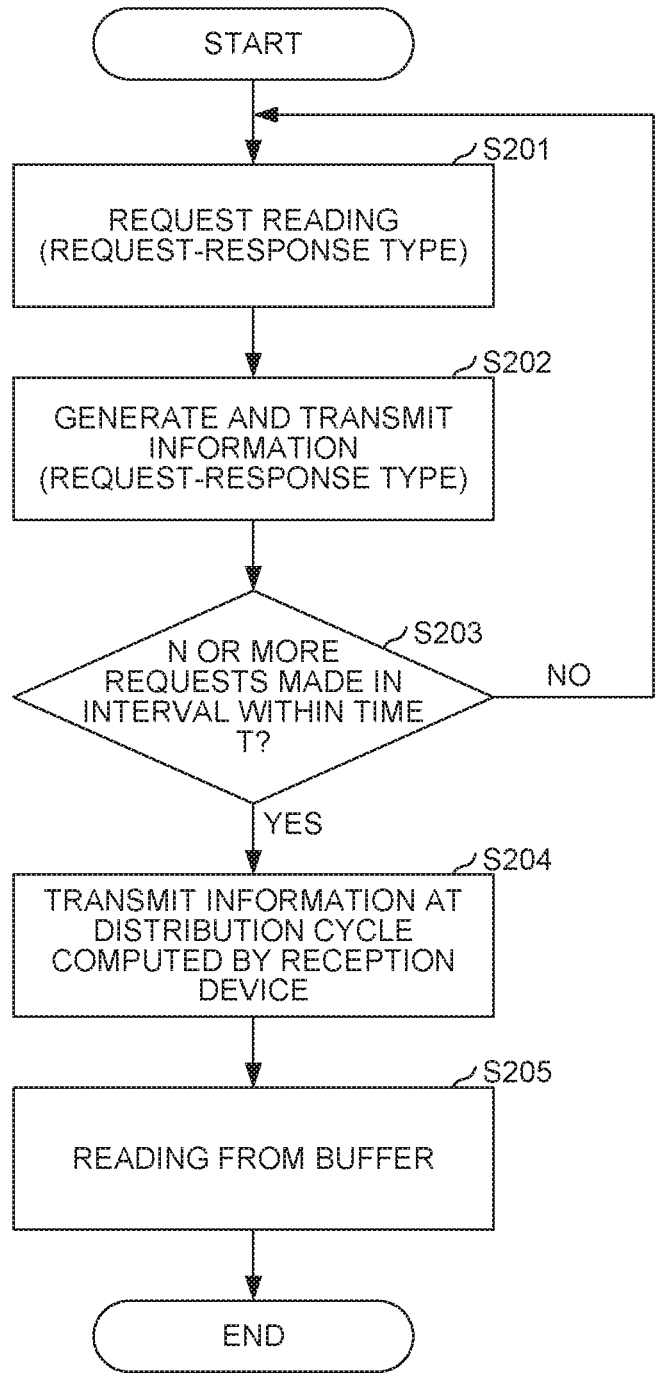
FIG. 7 is a flowchart illustrating operation of the control system 1 according to the second embodiment.

The operation of the control system 1 according to the second embodiment will be described with reference to the flowchart of FIG. 7.

Step S201: The read request transmission unit 2100 of the reception device 20 generates a read request and transmits the generated read request to the read request reception unit 1100 of the control device 10 via the communication network 30. It should be noted here that the read request does not include the designation of the distribution cycle. Specifically, a read request of the "request/response type" is transmitted.

Step S202: The read request reception unit 1100 of the control device 10 receives the read request transmitted in the step S201. The information generation unit 1300 generates the requested information as a response to this read request.

The information transmission unit 1400 transmits the generated information to the information reception unit 2500 of the reception device 20 via the communication network 30. Specifically, information transmission of the "request/response type" is performed here.

Step S203: The distribution cycle computation unit 2400 of the reception device 20 computes an interval "t" between the transmission time of the previous read request and the transmission time of the read request of this time, where the interval "t" is computed every time the read request transmission unit 2100 transmits the read request. Here, if the interval "t" is equal to or smaller than a threshold T, then the cumulative request count "n" (the initial value is 0) is incremented by 1. On the other hand, if the interval "t" is larger than the threshold T, then the cumulative request count "n" is initialized (cleared to the initial value 0).

If the cumulative request count "n" becomes equal to or larger than the threshold N, then distribution cycle computation unit 2400 computes the distribution cycle according to the following expression (1) and transmits the computed distribution cycle to the information generation unit 1300 of the control device 10 via the communication network 30. Also, the distribution cycle is notified from the distribution cycle computation unit 2400 or the information generation unit 1300 of the control device 10 to the information transmission unit 1400.

Step S204: information generation unit 1300 generates the information associated with the read request received in the step S202, for example, at the distribution cycle notified in the step S203. It should be noted that the information generation unit 1300 may generate the information in accordance with any other appropriate cycles. The information transmission unit 1400 transmits the generated information to the information reception unit 2500 of the reception device 20 via the communication network 30 at the distribution cycle notified in the step S203.

Step S205: The information reception unit 2500 of the reception device 20 receives the information that has been transmitted in the step S204 and stores the transmitted information in the buffer 2200. The reading unit 2300 reads the information stored in the buffer 2200 according to any appropriate timing.

According to the second embodiment, the reception device 20 automatically computes the distribution cycle when the read requests of the "request/response type" for N or more times in the interval within the time T have been transmitted. The control device 10 can receive the distribution cycle and make a transition to the "distribution type."

Third Embodiment

The control system 1 which will be described hereinbelow as the third embodiment is capable of making a transition from the "distribution type" to the "request/response type" according to a predetermined condition.

Figure 8:
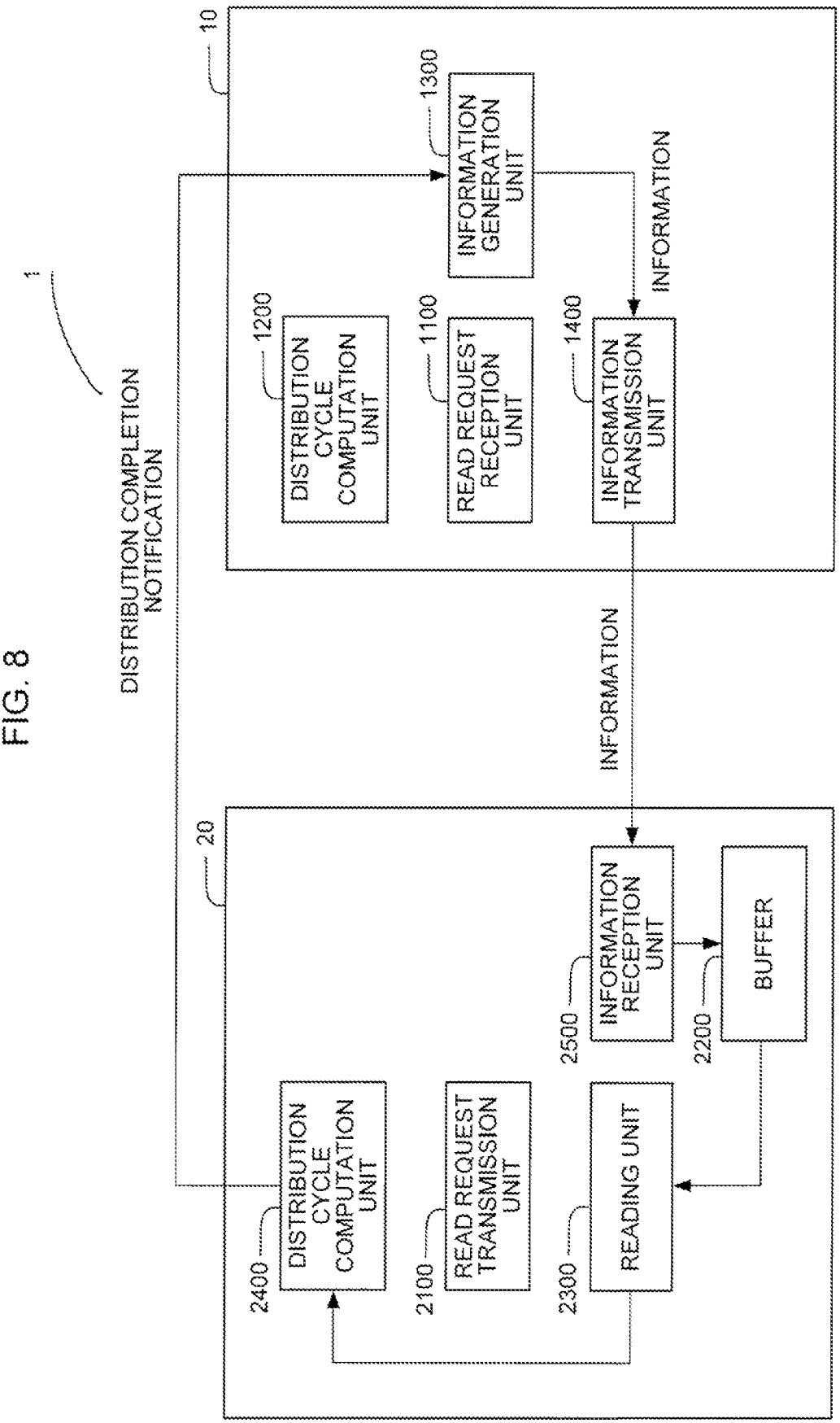
FIG. 8 is a block diagram illustrating a functional configuration of the control system 1 according to a third embodiment.

FIG. 8 is a block diagram that illustrates the functional configuration of the control system 1 according to the third embodiment. The third embodiment is characterized by the fact that the reception device 20 includes the distribution cycle computation unit 2400. It should be noted that the control device 10 may also include the distribution cycle computation unit 1200.

Figure 9:
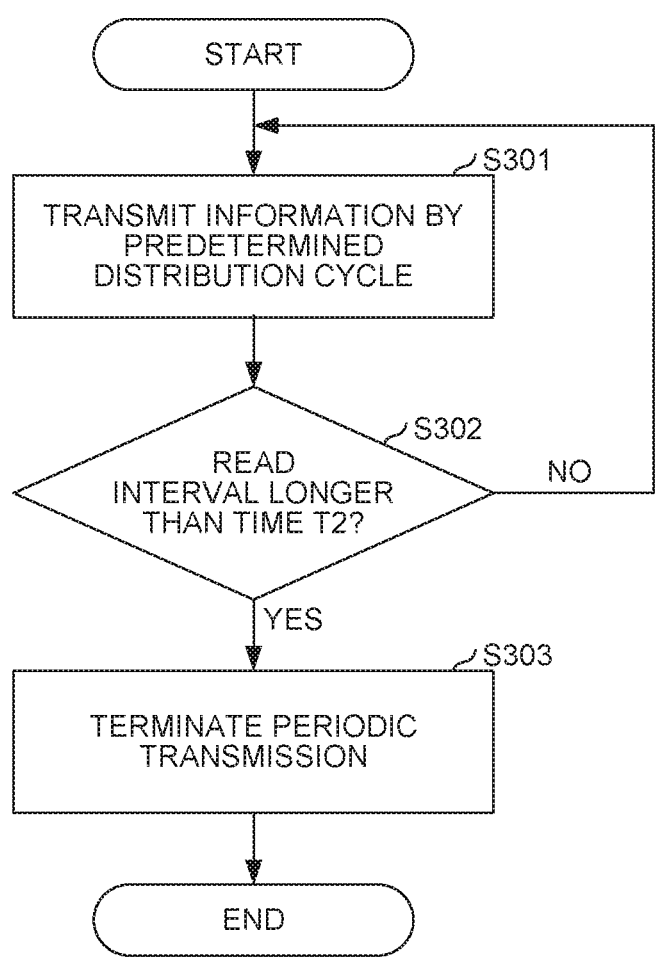
FIG. 9 is a flowchart illustrating operation of the control system 1 according to the third embodiment.

The operation of the control system 1 according to the third embodiment will be described with reference to the flowchart of FIG. 9.

Step S301: The control device 10 repeatedly performs the information generation by the information generation unit 1300 and the information transmission by the information transmission unit 1400 in accordance with a predetermined distribution cycle. Specifically, information transmission of the "distribution type" is performed.

The distribution cycle may be a distribution cycle designated in advance by the reception device 20 and may also be a distribution cycle computed by the distribution cycle computation unit 1200 or 2400 according to the scheme of the first or second embodiment.

The reading unit 2300 of the reception device 20 reads the information stored in the buffer 2200 according to any appropriate timing.

Step S302: The distribution cycle computation unit 2400 of the reception device 20 computes the interval "t2" between the previous read time and the read time of this time, where the interval "t2" is computed every time the reading unit 2300 reads the information stored in the buffer 2200 therefrom. Here, if the interval "t2" is smaller than the threshold T2, the process goes back to the step S301 to continue the reception of the information by the "distribution type." On the other hand, if the interval "t2" is equal to or larger than the threshold T2, then the process goes to the step S303.

Step S303: The distribution cycle computation unit 2400 transmits a notification to the effect that the information transmission by the "distribution type" should be terminated to the information generation unit 1300 of the control device 10 via the communication network 30. In response to this, the information generation unit 1300 terminates the periodical information generation. Also, the information transmission unit 1400 terminates the periodical information transmission.

According to the third embodiment, the reception device 20 determines that the periodical reading has been terminated when the reading interval by the reception device 20 becomes equal to or longer than the time T2 while the information transmission by the "distribution type" is being performed, in other words, when the interval implies that the reads occur only sparsely, and thus can make a transition to the "request/response type."

It should be noted that after the transition has been made to the information transmission of the "request/response type" in accordance with the scheme of the third embodiment, it is possible to make a further transition again from the information transmission of the "request/response type" to that of the "distribution type" in accordance with the scheme of the first or second embodiment.

Fourth Embodiment

The control system 1 which will be described hereinbelow as the fourth embodiment is capable of automatically computing the distribution cycle taking into account the state of the control device 10.

Figure 10:
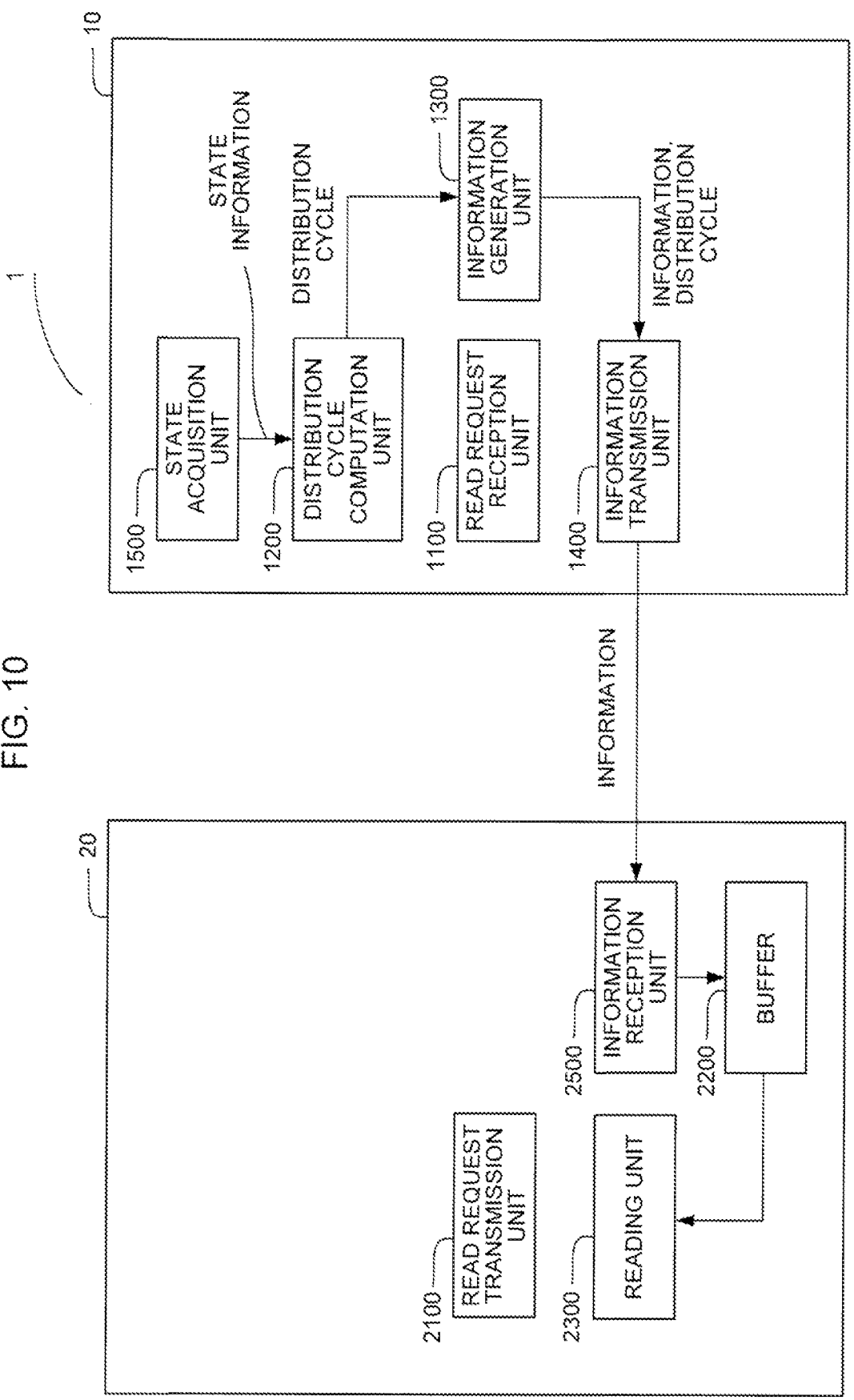
FIG. 10 is a block diagram illustrating a functional configuration of the control system 1 according to a fourth embodiment.

FIG. 10 is a block diagram that illustrates the functional configuration of the control system 1 according to the fourth embodiment. The fourth embodiment differs from the first embodiment in that the control device 10 further includes a state acquisition unit 1500. The other constituent components are the same as those of the first embodiment.

Figure 11:
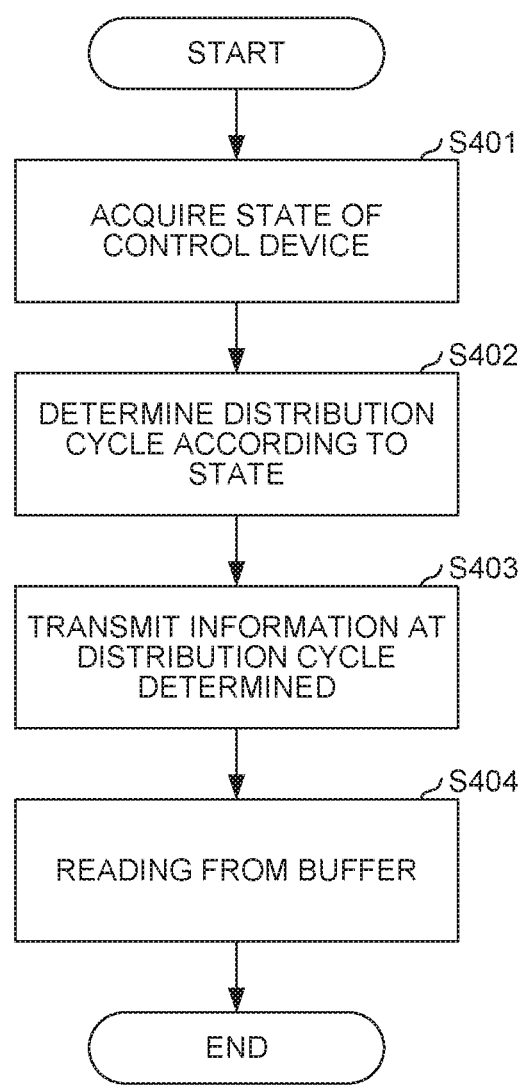
FIG. 11 is a flowchart illustrating operation of the control system 1 according to the fourth embodiment.

The operation of the control system 1 according to the fourth embodiment will be described with reference to the flowchart of FIG. 11.

Step S401: The state acquisition unit 1500 of the control device 10 acquires information indicative of the state of the control device 10 (hereinafter referred to as "state information"). The state information may include, but is not limited to, CPU utilization, the states of the individual functions in the control device 10 (in the case of a numerical control device, an operation mode (non-operation, manual operation, automatic operation, etc.), the function(s) being performed (simple cutting feeding, 5-axis machining feature, the number of prefetch blocks, etc.), the block length of the automatic operation, and the like), the level of network congestion degree, the number of the clients connected, the number of pieces of information being distributed, and whether or not real-time control is implemented by the control device 10 on the connected reception device 20. Since the method for acquiring the state information is known, detailed explanations thereof will be omitted.

Step S402: The distribution cycle computation unit 1200 of the control device 10 computes the distribution cycle on the basis of the state information acquired in the step S401. The distribution cycle computation unit 1200 uses, as the reference distribution cycle, the predetermined initial value of the distribution cycle, the distribution cycle designated in advance by the reception device 20, the distribution cycle computed by the distribution cycle computation unit 1200 in accordance with the scheme of the first embodiment, or any other distribution cycles, and adjusts the reference distribution cycle so that it is made longer or shorter in accordance with the state information. The distribution cycle computation unit 1200 transmits the adjusted distribution cycle to the information generation unit 1300. Also, the distribution cycle is notified from the distribution cycle computation unit 1200 or the information generation unit 1300 to the information transmission unit 1400.

The distribution cycle computation unit 1200 basically optimizes the reference distribution cycle such that the load of the control device 10 is not unnecessarily increased. This is for the purpose of ensuring that the machining quality and the machining time of the control device 10 is not adversely affected. Further, in a case where the reception device 20 performs real-time control or the like, the real-time nature of which is of importance, the reference distribution cycle can be optimized such that the distribution lag, i.e., the time lag between the generation and the transmission of the information is suppressed.

For example, the distribution cycle computation unit 1200 adjusts the distribution cycle so that it is made longer in proportion to the CPU utilization and the level of network congestion. Also, for example, in the case of a numerical control device, since it is known that the CPU load varies depending on the operation modes (typically, the CPU load increases in the order of non-operation<manual operation<automatic operation), the distribution cycle is adjusted so that it is made longer in an operation mode with high CPU load. Also, for example, in the case of a numerical control device, the distribution cycle is adjusted to become longer in response to a shorter block length of the automatic operation. Further, the distribution cycle is adjusted to become longer in response to a larger number of clients connected and a larger number of the information being distributed.

The distribution cycle computation unit 1200 may define a minimum value of the distribution cycle and clamp the distribution cycle to the minimum value. Specifically, it is possible to implement restriction to ensure that the distribution cycle does not become shorter than the length of time indicated by the minimum value. Here, the minimum value can be specified in advance in accordance with the operation modes (non-operation, manual operation, automatic operation etc.), the functions that are being performed (simple cutting feeding, 5-axis machining feature, the number of prefetch blocks, etc.), and the like.

On the other hand, it is preferable that the distribution cycle computation unit 1200 adjusts the distribution cycle such that it is made shorter when the reception device 20 is performing processing whose real-time nature is important, typically, the real-time control.

Step S403: The information generation unit 1300 generates the information, for example, at the distribution cycle that has been notified in the step S402. It should be noted that the information generation unit 1300 may generate the information in accordance with any other appropriate cycles. Information transmission unit 1400 transmits the generated information to the information reception unit 2500 of the reception device 20 via the communication network 30 at the distribution cycle notified in the step S402.

Step S404: The information reception unit 2500 of the reception device 20 receives the information that has been transmitted in the step S403 and stores the transmitted information in buffer 2200. The reading unit 2300 reads the information stored in the buffer 2200 according to any appropriate timing.

According to the fourth embodiment, the control device 10 can optimize the distribution cycle of the information in accordance with the state of the control device 10.

Fifth Embodiment

The control system 1 which will be described hereinbelow as the fifth embodiment is configured to compute the distribution cycles by the schemes of the first and fourth embodiments, respectively, and adopts the longer one of these distribution cycles as the definitive distribution cycle.

Figure 12:
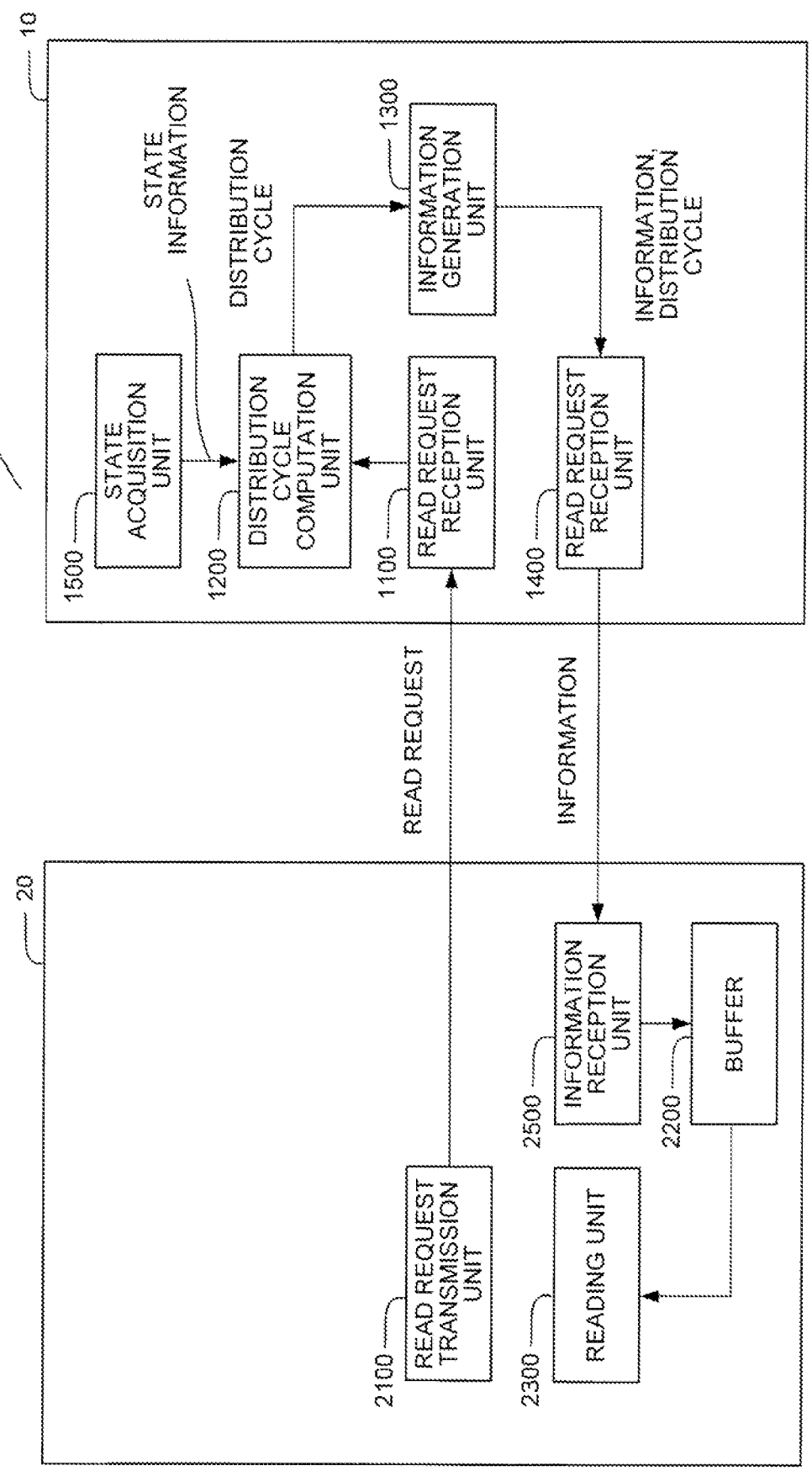
FIG. 12 is a block diagram illustrating a functional configuration of the control system 1 according to a fifth embodiment.

FIG. 12 is a block diagram that illustrates the functional configuration of the control system 1 according to the fifth embodiment. The constituent components thereof are the same as those of the fourth embodiment.

Figure 13:
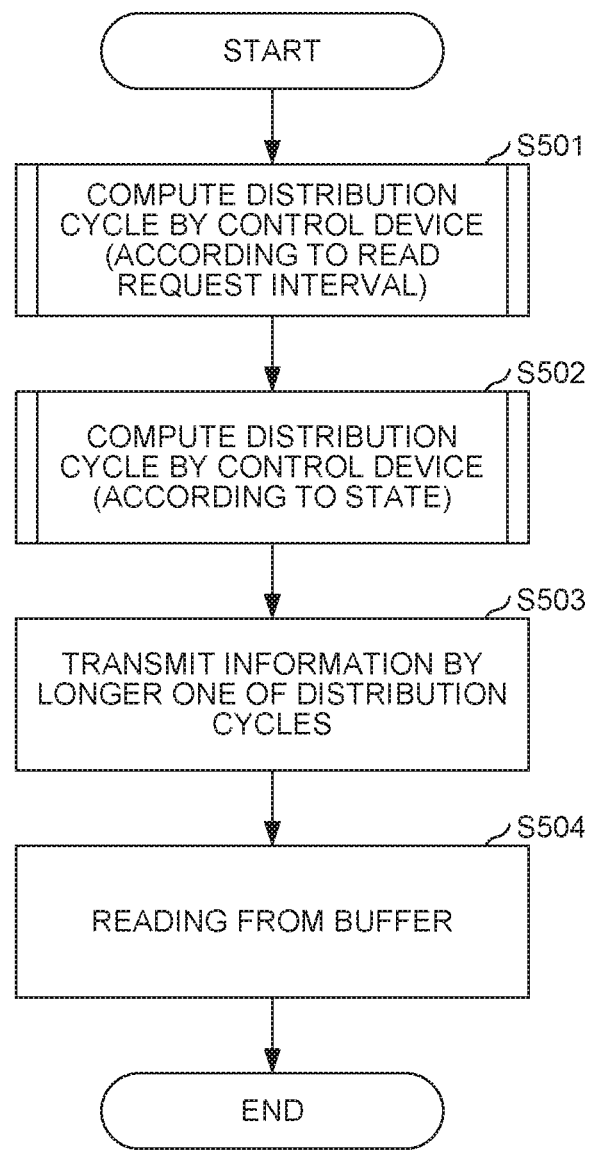
FIG. 13 is a flowchart illustrating operation of the control system 1 according to the fifth embodiment.

The operation of the control system 1 according to the fifth embodiment will be described with reference to the flowchart of FIG. 13.

Step S501: The distribution cycle computation unit 1200 of the control device 10 computes the distribution cycle in accordance with the scheme illustrated in the first embodiment. Specifically, the distribution cycle computation unit 1200 computes the distribution cycle in accordance with the expression (1) when the read requests of the "request/response type" have been received for N or more times in the interval within the time T.

Step S502: The distribution cycle computation unit 1200 computes the distribution cycle in accordance with the scheme illustrated in the fourth embodiment. Specifically, the distribution cycle computation unit 1200 adjusts the predetermined reference distribution cycle on the basis of the state information acquired by the state acquisition unit 1500 and computes the optimum distribution cycle. Preferably, the step S502 is performed independently of and in parallel with the step S501.

Step S503: The distribution cycle computation unit 1200 compares the distribution cycle computed in the step S501 with the distribution cycle computed in the step S502 and selects the longer one of these distribution cycles as the definitive distribution cycle. The distribution cycle computation unit 1200 transmits the selected distribution cycle to the information generation unit 1300. Also, the distribution cycle is notified from the distribution cycle computation unit 1200 or the information generation unit 1300 to the information transmission unit 1400. The information generation unit 1300 generates the information at the notified distribution cycle. It should be noted that the information generation unit 1300 may generate the information in accordance with any other appropriate cycles. Also, the information transmission unit 1400 transmits the information at the notified distribution cycle to the information reception unit 2500 of the reception device 20 via the communication network 30.

Step S504: The information reception unit 2500 of the reception device 20 receives the information that has been transmitted in the step S503 and stores the transmitted information in buffer 2200. The reading unit 2300 reads the information stored in the buffer 2200 according to any appropriate timing.

According to the fifth embodiment, it is made possible to transmit information at optimum distribution cycle which conforms to the interval of the read requests on the side of the reception device 20 and takes into account the state of the control device 10.

Sixth Embodiment

Figure 14:
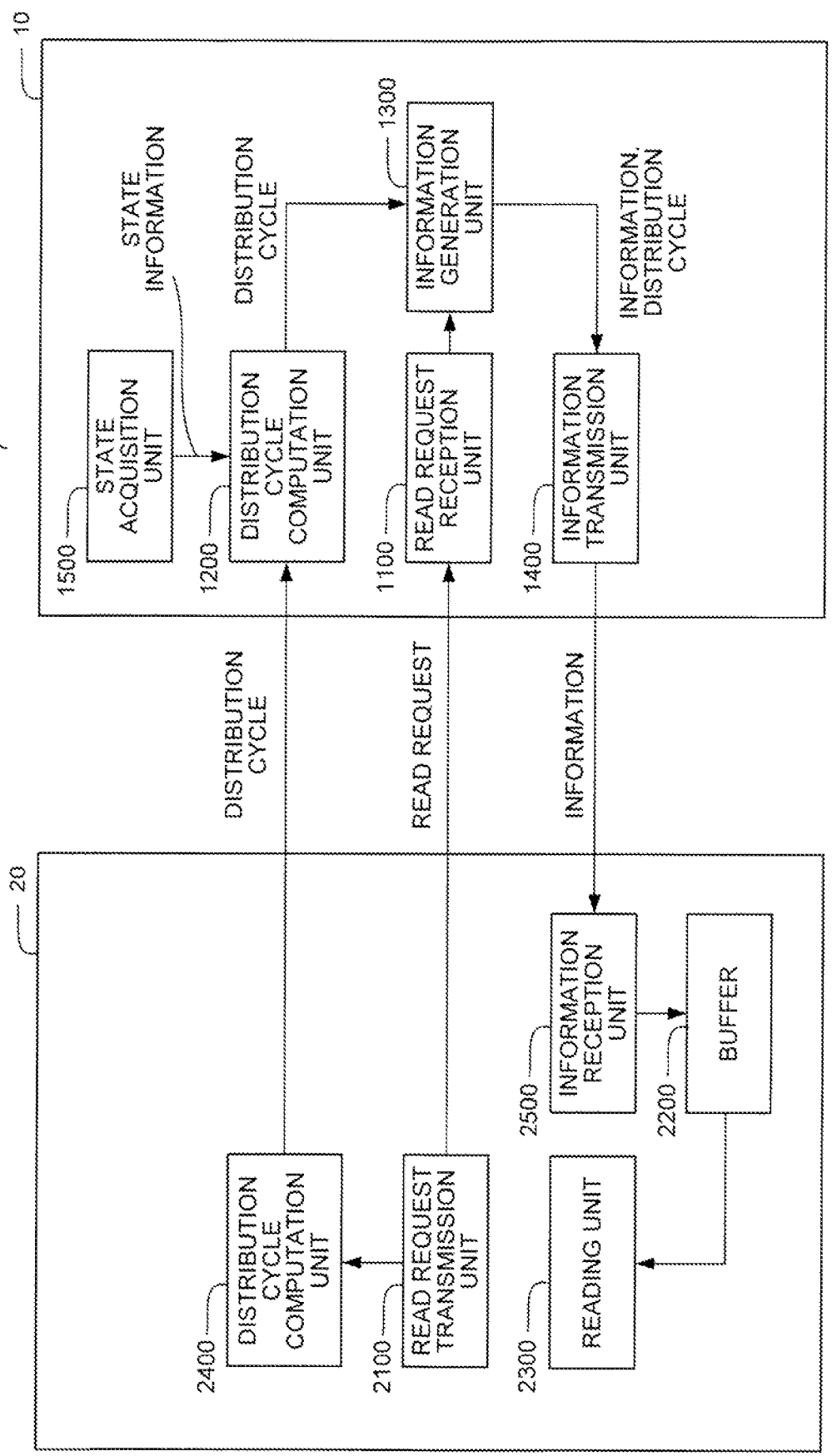
FIG. 14 is a block diagram illustrating a functional configuration of the control system 1 according to a sixth embodiment.

The sixth embodiment is a modified example of the fifth embodiment. FIG. 14 is a block diagram that illustrates the functional configuration of the control system 1 according to the sixth embodiment. The sixth embodiment differs from the fifth embodiment in that the reception device 20 includes the distribution cycle computation unit 2400. The other constituent components are the same as those of the fifth embodiment.

Figure 15:
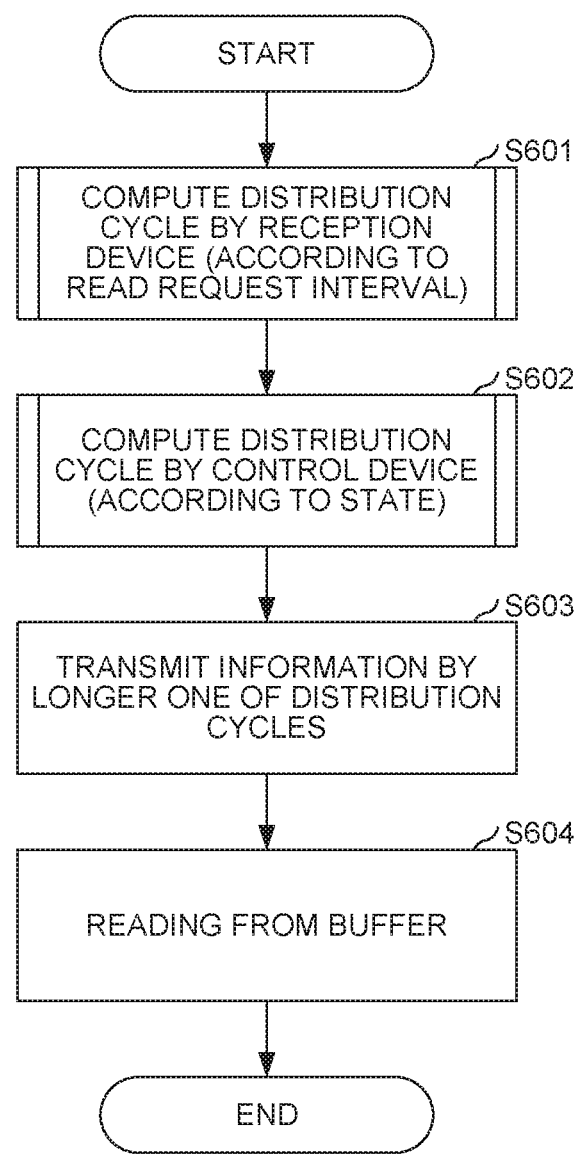
FIG. 15 is a flowchart illustrating operation of the control system 1 according to the sixth embodiment.

The operation of the control system 1 according to the sixth embodiment will be described with reference to the flowchart of FIG. 15.

Step S601: The distribution cycle computation unit 2400 of the reception device 20 computes the distribution cycle in accordance with the scheme illustrated in the second embodiment. Specifically, distribution cycle computation unit 2400 computes the distribution cycle in accordance with the expression (1) when the read requests of the "request/response type" for N or more times in the interval within the time T have been transmitted. Also, the computed distribution cycle is transmitted to the distribution cycle computation unit 1200 of the control device 10 via the communication network 30.

Step S602: The distribution cycle computation unit 1200 of the control device 10 computes the distribution cycle in accordance with the scheme illustrated in the fourth embodiment. Specifically, distribution cycle computation unit 1200 adjusts the predetermined reference distribution cycle on the basis of the information acquired by the state acquisition unit 1500 and computes the optimum distribution cycle. Preferably, the step S602 is performed independently of and in parallel with the step S601.

Step S603: The distribution cycle computation unit 1200 compares the distribution cycle computed in the step S601 with the distribution cycle computed in the step S602 and selects the longer one of these distribution cycles as the definitive distribution cycle. The distribution cycle computation unit 1200 transmits the selected distribution cycle to the information generation unit 1300. Also, the distribution cycle is notified from the distribution cycle computation unit 1200 or the information generation unit 1300 to the information transmission unit 1400. The information generation unit 1300 generates the information at the distribution cycle that has been notified. It should be noted that the information generation unit 1300 may generate the information in accordance with any other appropriate cycles. Also, the information transmission unit 1400 transmits the information at the notified distribution cycle to the information reception unit 2500 of the reception device 20 via the communication network 30.

Step S604: The information reception unit 2500 of the reception device 20 receives the information that has been transmitted in the step S603 and stores the transmitted information in the buffer 2200. The reading unit 2300 reads the information stored in the buffer 2200 according to any appropriate timing.

According to the sixth embodiment, it is made possible to transmit information at optimum distribution cycle which conforms to the interval of the read requests on the side of the reception device 20 and takes into account the state of the control device 10.

According to this embodiment, periodical information distribution can be achieved by automatically determining the optimum distribution cycle without the need of explicit designation of the distribution cycle on the side of the reception device 20 which is the reading side. Also, since the distribution cycle can be adjusted in accordance with the state of the control device 10, the control device 10 and the network are protected from exposure to high or unnecessary load and thus stable operations can be maintained.

Whilst the embodiments of the present invention have been described, the present invention is not limited to the above-described embodiments or examples in the above-described embodiments and the present inventions can be implemented in various modes with modifications made thereto as appropriate. For example, although the above-described embodiments compute the distribution cycle in accordance with the expression (1), the expression (1) is only an exemplary one to which the present invention is in no way limited. Other possible expressions can be adopted that allows for the computation of the distribution cycle on the basis of the generation interval of the read request.

Also, while the above-described embodiments determine presence or absence of a transition to the "distribution type" on the basis of the generation interval of the read requests and the number of times of successive read requests, the present invention is not limited to this and may make a transition to the "distribution type" by any other appropriate trigger.

Also, while the above-described embodiments have been basically described by way of examples where both of the information generation unit 1300 and the information transmission unit 1400 perform the generation and transmission of the information in accordance with the distribution cycle notified from the distribution cycle computation unit 1200 or 2400. However, the present invention is not limited to this and the information generation unit 1300 may perform generation of the information in accordance with any other cycle or timing different than the distribution cycle notified from the distribution cycle computation unit 1200 or 2400.

Whilst the embodiments of the present invention have been described in the foregoing, the present invention is not limited to the examples in the above-described embodiments and may be implemented in various modes with modifications made thereto as appropriate.

The invention claimed is:

1. A control system that distributes information from a control device to a reception device, the control system comprising:
   a read request transmission unit configured to transmit a read request to the control device to read the information from the control device;

an information generation unit configured to generate the information from the control device in response to the read request;

an information transmission unit configured to transmit the generated information to the reception device; and a distribution cycle computation unit configured to compute a distribution cycle based on a generation interval of the read request, the information transmission unit being configured to transmit the information in accordance with the distribution cycle computed by the distribution cycle computation unit.

2. The control system according to claim 1, wherein the reception device includes:

the distribution cycle computation unit;

a buffer configured for reception of the information transmitted in accordance with the distribution cycle; and a reading unit configured to read the information from the buffer, and the distribution cycle computation unit is configured to stop transmission of the information in accordance with the distribution cycle when a read interval at which the reading unit reads the information satisfies a predetermined condition.

3. The control system according to claim 1, wherein the control device includes:

the distribution cycle computation unit; and a state acquisition unit configured to acquire a state of the control device, and the distribution cycle computation unit is configured to compute the distribution cycle on the basis of the state.

4. The control system according to claim 3, wherein the information generation unit is configured to compare the distribution cycle computed on the basis of the generation interval of the read request with the distribution cycle computed on the basis of the state of the control device and transmit the information in accordance with a longer one of the distribution cycles.

* * * * *